US008572065B2

(12) United States Patent
McDonald et al.

(10) Patent No.: US 8,572,065 B2
(45) Date of Patent: Oct. 29, 2013

(54) LINK DISCOVERY FROM WEB SCRIPTS

(75) Inventors: Kieran Richard McDonald, Seattle, WA (US); Srinath Reddy Aaleti, Redmond, WA (US); Richard J. Qian, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 615 days.

(21) Appl. No.: 11/937,751

(22) Filed: Nov. 9, 2007

(65) Prior Publication Data

US 2009/0125469 A1    May 14, 2009

(51) Int. Cl.
*G06F 7/00* (2006.01)

(52) U.S. Cl.
USPC ........... 707/708; 707/709; 707/736; 707/769; 709/217

(58) Field of Classification Search
None
See application file for complete search history.

(56) References Cited

U.S. PATENT DOCUMENTS

| | | | |
|---|---|---|---|
| 6,374,260 B1* | 4/2002 | Hoffert et al. | 1/1 |
| 6,847,977 B2 | 1/2005 | Abajian | |
| 6,865,593 B1* | 3/2005 | Reshef et al. | 709/203 |
| 7,100,109 B1 | 8/2006 | Chartier | |
| 7,143,088 B2 | 11/2006 | Green | |
| 7,260,564 B1 | 8/2007 | Lynn | |
| 7,536,389 B1* | 5/2009 | Prabhakar et al. | 1/1 |
| 2002/0078136 A1 | 6/2002 | Brodsky | |
| 2003/0046385 A1* | 3/2003 | Vincent | 709/224 |
| 2004/0030741 A1* | 2/2004 | Wolton et al. | 709/202 |
| 2004/0059809 A1 | 3/2004 | Benedikt | |
| 2004/0098451 A1* | 5/2004 | Mayo | 709/203 |
| 2004/0143787 A1 | 7/2004 | Grancharov | |
| 2004/0158617 A1* | 8/2004 | Shanny et al. | 709/217 |
| 2004/0168132 A1* | 8/2004 | Travieso et al. | 715/536 |
| 2006/0190561 A1* | 8/2006 | Conboy et al. | 709/217 |
| 2006/0230011 A1* | 10/2006 | Tuttle et al. | 706/62 |
| 2008/0235671 A1* | 9/2008 | Kellogg et al. | 717/139 |
| 2009/0125480 A1* | 5/2009 | Zhang et al. | 707/2 |

OTHER PUBLICATIONS

Shreeraj Shah, "Crawling Ajax-driven Web 2.0 Applications," www.infosecwriters.com/text_resources/pdf/Crawling_AJAX_SShah.pdf, No date, 9 pp.

"Free Link Extractor—Extract All HTML Links," www.selfseo.com/link_extractor.php, Sep. 19, 2007, 1 page.

"Web Application Scanners: Technical Challenges," Application Security Software, Consulting, and Services Solutions from NT Objectives, Inc., www.ntoobjectives.com/know/techchallenges.php, Sep. 19, 2007, 3 pp.

\* cited by examiner

*Primary Examiner* — Fred I Ehichioya
*Assistant Examiner* — Hasanul Mobin
(74) *Attorney, Agent, or Firm* — Shook, Hardy & Bacon L.L.P.

(57) ABSTRACT

A computer-implemented method, a computer system, and computer media for discovering links in scripts are provided. The computer system includes a crawler, a rules engine, and an index that are utilized to store links generated by scripts located in webpages in the index. The crawler traverses a network to locate webpages having scripts. The rules engine parses the located webpages and extracts the scripts based on rules that are satisfied by segments of the extracted scripts. The rules engine evaluates the segments of the extracted scripts to generate links. After the rules engine validates the links, the rules engine transmits the links to the index for storage.

19 Claims, 5 Drawing Sheets

LINK DISCOVERY FROM WEB SCRIPTS

BACKGROUND

Conventionally, scripts are utilized to allow a user to interact with content provided by a webpage or to dynamically generate content based on user interaction. The dynamically generated content may include multimedia presentations and other complex content. The scripts may be part of a webpage that a conventional crawler accesses when indexing webpages.

The conventional crawler parses the webpage and stores data included in the webpage in an index to allow efficient retrieval of the webpage. The conventional crawler ignores the scripts corresponding with the webpage because the conventional crawler is unable to interpret or evaluate the scripts. The conventional crawler fails to index data corresponding to the content dynamically generated by the scripts. A user accessing the index to retrieve results for a webpage having scripts receives incomplete results because the index does not include data corresponding to the dynamically generated content associated with the scripts.

SUMMARY

A rules engine connected to a crawler parses webpages traversed by the crawler and extracts segments of scripts associated with the webpages. The rules engine utilizes rules stored in a rules database to evaluate the scripts and identify links that are generated by the scripts. The links are stored in an index. Additionally, the rules engine may generate additional rules for functions defined in the scripts when the functions encapsulate scripting code that generate links based on rules stored in the rules database. The rules engine verifies that each can be validly applied to the matched scripting code and generates the discovered link, and the crawler retrieves content associated with each link, optimizes the content, and stores the optimized content and corresponding links in the index.

This Summary is provided to introduce a selection of concepts in a simplified form. The selection of concepts are further described below in the Detailed Description. This Summary is not intended to identify key features or essential features of the claimed subject matter, nor is it intended to be used as an aid in determining the scope of the claimed subject matter.

DETAILED DESCRIPTION

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

As utilized herein, the term "link" refers to a locator that references a webpage, content within the webpage, video content, audio content, or any other object. Additionally, as utilized herein, the term "component" refers to any combination of hardware, software, or firmware.

Computer-readable media include both volatile and nonvolatile media, removable and nonremovable media, and contemplates media readable by a server and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, cache, flash memory, or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

A crawler that discovers all links corresponding with a webpage may provide improved link analysis and better indexing for search applications. The crawler may connect to a rules engine. The rules engine processes the webpages and corresponding scripts to identify links by matching rules and evaluating the corresponding scripts. The identified links are stored in an index with metadata for the webpages and metadata for the corresponding scripts that generate the identified links.

Figure 1:
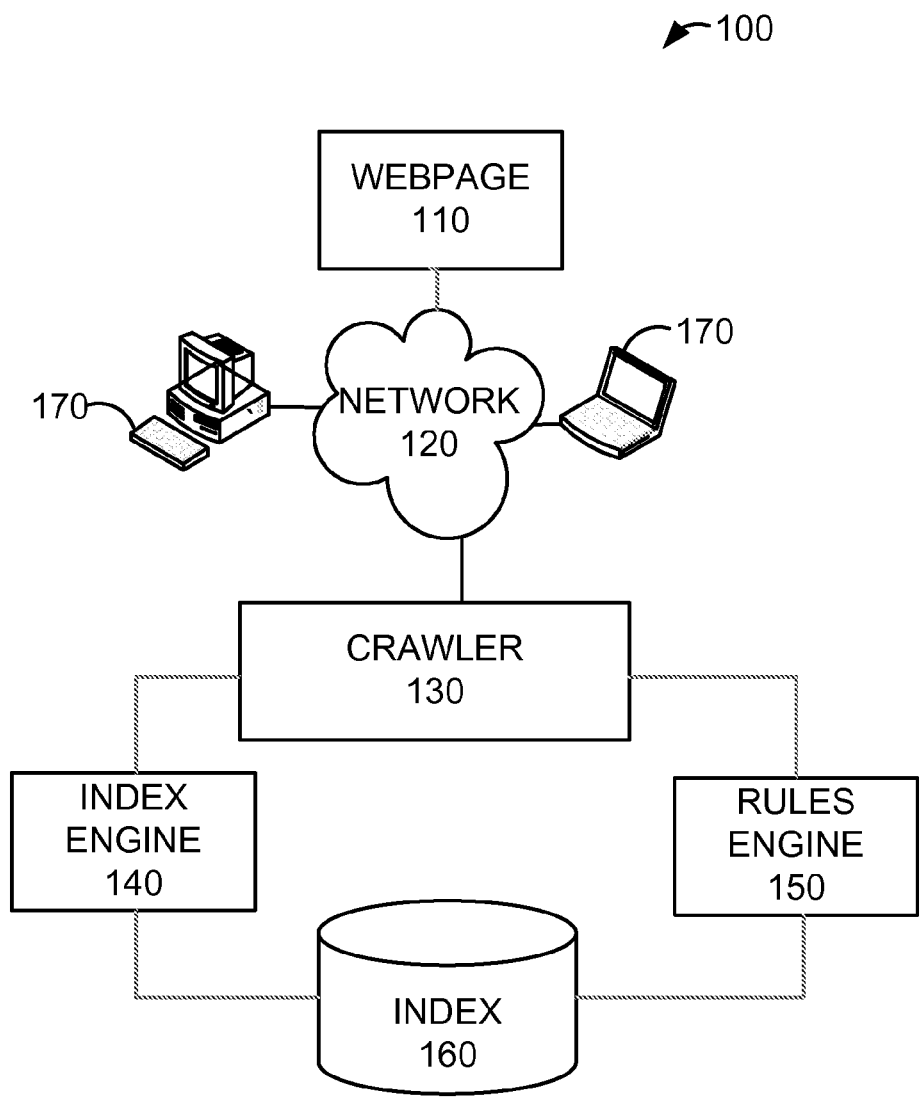
FIG. 1 is a network diagram that illustrates an exemplary operating environment.

FIG. 1 is a network diagram that illustrates an exemplary operating environment 100. The operating environment 100 includes webpages 110, a network 120, a crawler 130, an index engine 140, a rules engine 150, and an index 160.

The webpages 110 are located at various locations on the network 120. The crawler 130 traverses the network 120 to store data associated with the webpages 110 in the index 160. The webpages 110 are pages that contain content for presentation to users of the client devices 170. The webpages 110 may include scripts that enable the user to interact with content. The content may include multimedia content, such as video, audio, or text. The webpages 110 may be formatted using a markup language. In certain embodiments, the markup language is a hypertext markup language (HTML).

The network 120 is configured to facilitate communication between the client devices 170, the webpages 110, and the index 160. Additionally, the network 120 enables the crawler 130 to access the webpage 110. The network 120 may be a communication network, such as a wireless network, local area network, wired network, or the Internet. In an embodiment, the client devices 170 communicate search requests to the index 160 utilizing the network 120 to retrieve webpages 110 that match the search requests. In response, the index 160 provides the client devices 170 with results that include the webpages 110 and corresponding content that match the search requests.

The crawler 130 is a device that traverses the network 120 to locate webpages 110 and store data associated with the webpages 110 in the index 160. The crawler 130 utilizes the index engine 140 and the rules engine 150 to parse the webpages 110 and store data associated with the webpages 110 in the index 160. The data associated with the webpages 110 may include links to additional content that the webpages 110 may retrieve. In some embodiments, the crawler 130 communicates with the rules engine 150 to parse webpages 110 that contain scripts. The scripts are parsed and evaluated by the rules engine 150 to extract links that may be generated by the scripts.

The index engine 140 is a device that communicates with the crawler 130 to store data associated with the webpages 110 in the index 160. The index engine 140 receives data for the webpages 110 from the crawler 130. The index engine 140 may parse the webpages 110 and utilize markup language tags to process the content in the webpages 110. The index engine 140 identifies keywords associated with the webpages, associates the keywords with the webpages 110, and stores the keywords and webpages in the index 160. In an alternate embodiment, the indexing engine 140 may associate the keywords with content—videos, images, audio, or other multimedia files and streams—contained within the webpages. In certain embodiments, the index engine 140 is a component of the crawler 130.

The rules engine 150 is a device that communicates with the crawler 130 to store links associated with the webpages 110 in the index 160. The rules engine 150 receives data for the webpages 110 from the crawler 130. The rules engine 150 identifies scripts corresponding to the webpages 110, parses the scripts to locate segments of the scripts that generate links, and evaluates the segments of the scripts to validate the links generated by the segments of the scripts. In turn, the rules engine 150 associates the validated links with the webpages 110 and stores the validated links and their relationship with the associated webpages 110 in the index 160. In certain embodiments, the rules engine 150 is a component of the crawler 130.

The index 160 is configured to communicate with the client devices 170, the crawler 130, the index engine 140, and the rules engine 150. The index 160 includes data about the webpages 110. The data may include, among other things, locators for the webpages 110, keywords for the webpages 110, links included in the webpages 110, links generated by scripts associated with the webpages 110, content included in the webpages 110, content associated with the links, and ranks associated with each webpage 110. The content stored in the index may include text, video, images, audio, or other multimedia files and streams. The index 160 is populated by the index engine 140 and rules engine 150 based on the webpages 110 accessed by the crawler 130. The index 160 responds to search requests received from the client devices 170 and returns results that include webpages or content that matches the search results.

The client devices 170 may be utilized by a user to generate search requests for the index 160. The client devices 170 may include, without limitation, personal digital assistants, smart phones, laptops, personal computers, or any other suitable client computing device. The search requests generated by the client devices 170 may include terms or content that a user intends to locate.

An artisan of ordinary skill appreciates and understands that the exemplary operating environment 100 has been simplified and that alternate arrangements are within the scope of the above description.

The webpages present content to a user. In some embodiments, the webpages are associated with scripts that dynamically generate content that is presented to the user. The scripts associated with the webpages include external scripts, inline scripts, and event handler scripts. Additionally, the scripts may include client-side scripts associated with media players. The scripts are processed by the rules engine to identify links that are generated by the scripts and to store the identified links with the webpages or content.

Figure 2:
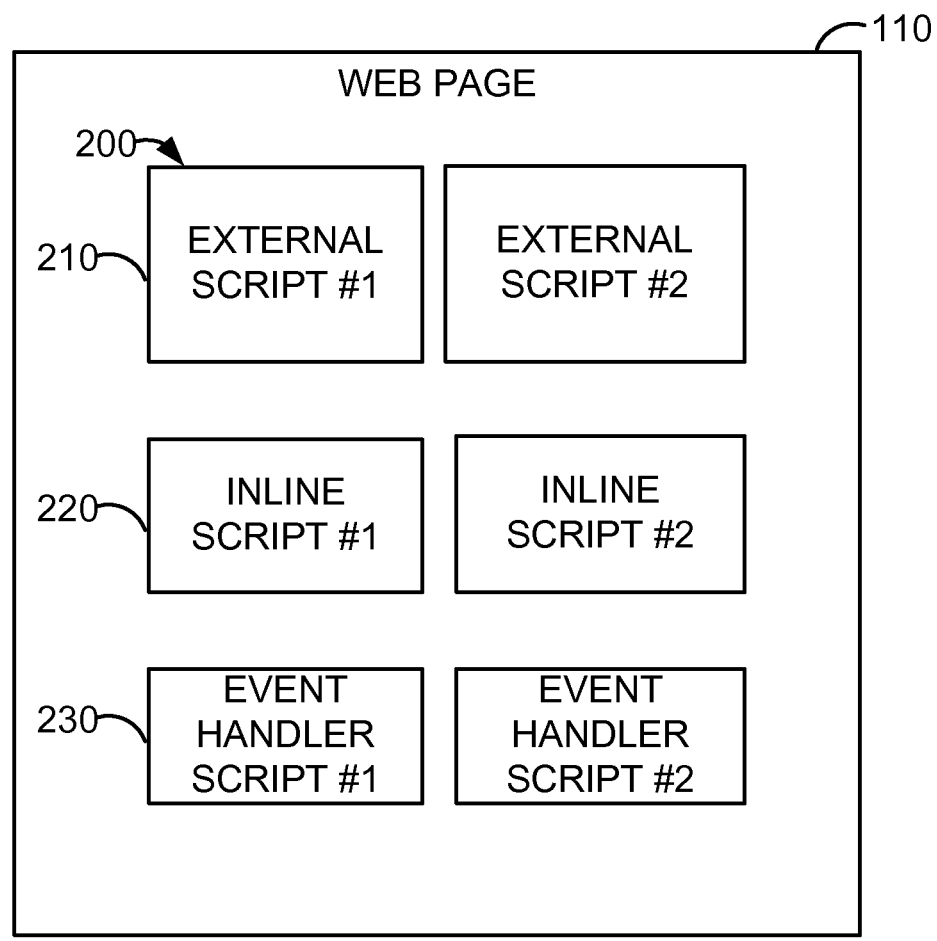
FIG. 2 is a schema diagram that illustrates exemplary scripting elements of a webpage.

FIG. 2 is a schema diagram that illustrates exemplary scripting elements 200 of a webpage 110. The scripting elements 200 comprise external scripts 210, inline scripts 220, and event handler scripts 230.

The external scripts 210 are scripts associated and reference within the webpage 110. The external scripts 210 are stored at a location external to the location of the webpage 110. The external scripts 210 may be script files that are stored at locations external to the webpage 110. The external scripts 210 may include segments that generate links for additional content. The rules engine obtains the external scripts 210 and parses the external scripts 210 to locate the segments that generate links.

The inline scripts 220 are scripts contained within the webpage 110. The inline scripts 220 may generate links for additional content. The inline scripts 220 are processed by the rules engine to locate segments of the inline scripts 220 that generate links. In some embodiments, the rules engine identifies the inline scripts 220 by markup language tags that format the webpage 110. For instance, a markup language script tag may embed the inline script 220 in the webpage 110.

The event handler scripts 230 are scripts that respond to user interactions with the webpage 110 and web browser events, i.e., page loading, page unloading, etc. The event handler scripts 230 are processed by the rules engine to locate segments that generate links for additional content. For instance, when a user interacts with a webpage 110 and clicks on a portion of the webpage 110, an event may be triggered that generates a link.

In an embodiment, the scripting elements 200 are client-side scripts associated with media players that play content for the webpage 110. The client-side scripts may generate additional markup language for content or may generate popup windows for the media players that render the content. In some embodiments, the content includes video files that are accessed by a link generated from the client-side scripts.

The rules engine processes the webpages and associated scripts to identify segments of the scripts that generate links. The rules engine utilizes rules for functions, variables, and constants to identify segments of the script that generate links. The rules engine parses the scripts and evaluates the identified segments to validate the links generated by the identified segments. In turn, the links and the webpages or content are stored in an index.

Figure 3:
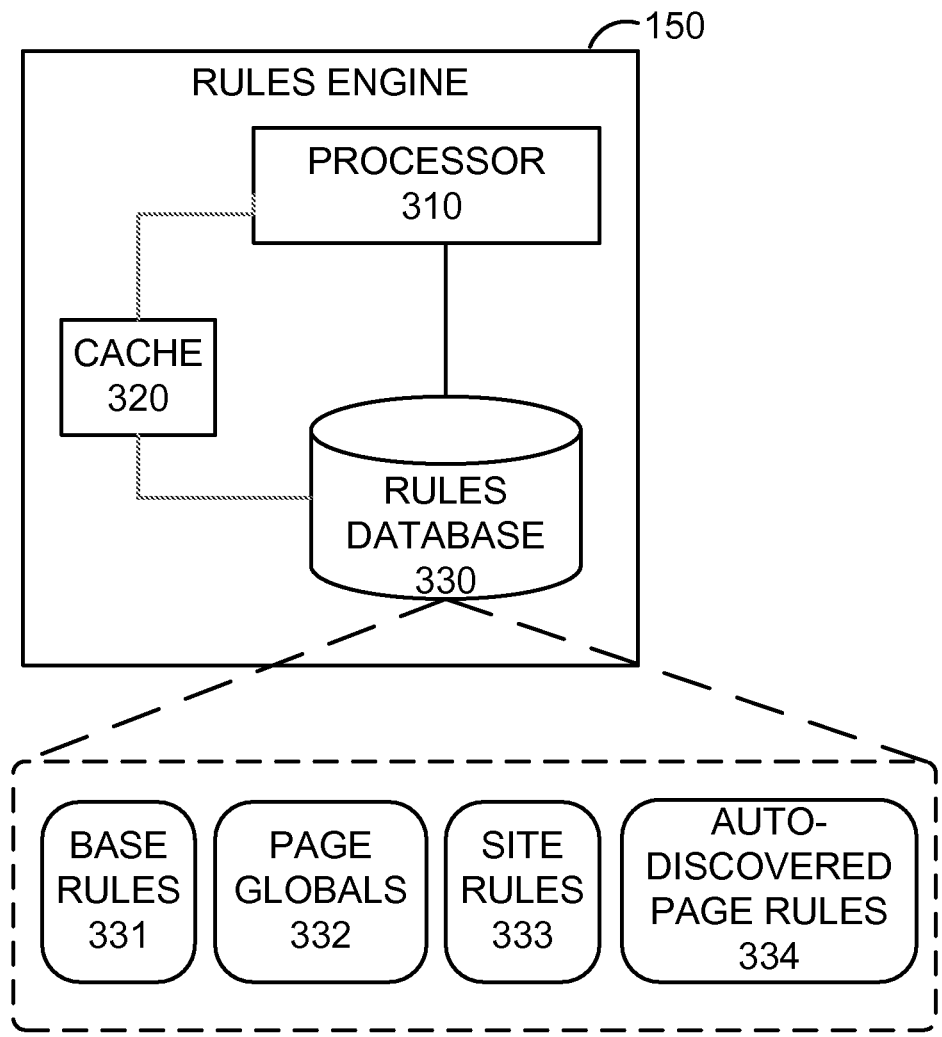
FIG. 3 is a block diagram that illustrates an exemplary rules engine.

FIG. 3 is a block diagram that illustrates an exemplary rules engine 150. The rules engine 150 includes a processor 310, a cache 320, and a rules database 330.

The processor 310 parses the scripts included in the webpages. The processor 310 accesses the rules database 330 to identify segments of the scripts that match the rules included in the rules database 330. In certain embodiments, the processor 310 extracts variables and constants from the identified segments of the scripts to generate the links for the webpage. The processor 310 evaluates the identified segments to generate the link. The processor 310 stores the links and metadata for the webpage and metadata for the link in the index. The metadata for the link may include, among other things, content type, content size, content width, content height, content name, content metadata, interaction metadata, dialog attributes, popup attributes, identifiers for segments of the script associated with the webpage that generated the link, and rules that identified the segment of the script. The processor 310 selects rules having varying scopes from the rules database 330 to locate segments of the scripts that generate links. The scope of the rules include: base rules 331, having a scope that is unlimited, that are applied to all webpages; site rules 333, having a scope that is restricted, that are applied to all webpages from a specified site; subsite rules, having a scope that is restricted, that are applied to groups of pages from a specified site; or auto-discovered page rules 334, having a scope that is restricted, that are applied to individual webpages within a site. In certain embodiments, auto-discovered page rules 334 that are based on external scripts may have a scope of all webpages that reference the external script. The base rules 331 may include rules derived from standard JavaScript functions. The site rules 333 may include rules that are manually generated for a site. The auto-discovered page rules 334 may include rules that are automatically discovered for individual webpages on the site. In some embodiments, the processor 310 may select rules that check for matching function variables or matching function patterns. The matching function variables require the segment of the script to invoke a function having similar variables. The matching function patterns require the segment of the script to invoke functions having similar variables and values. The processor 310 may utilize the rules to ensure that variables corresponding to the segments of the scripts have a specified value. For instance, the processor 310 may select rules that check for the existence or nonexistence of a variable and check for equality to a specific value for a variable.

The cache 320 temporarily stores constants and variables extracted from the segments identified by the processor 310. The cache 320 also stores additional rules that are derived for functions in the identified segments that are related to rules for other functions in the rules database 330. The additional rules may include auto-discovered page rules 334. In certain embodiments, the cache 320 is accessed to retrieve the additional rules, constants, or variables to generate a link by evaluating an identified segment of the script.

The rules databases 330 is accessed by the processor 310 to retrieve rules for parsing the scripts associated with a webpage. The rules database 330 stores base rules 331, page globals 332, site rules 333, and auto-discovered page rules 334. In some embodiments, page globals 332 and additional rules that include the auto-discovered page rules 334 are only temporarily stored in the cache 320 and are not stored in the rules database 330.

The base rules 331 comprise rules that identify functions and variable assignments for generating a link or additional content. The base rules 331 may include function rules, variable rules, and dynamic rules. The function rules enable the processor 310 to match segments of the scripts based on function call criteria, i.e., a name of the function, a number of parameters, or a number of variables associated with the function invoked by the segments of the scripts. For instance, a function rule may cause the processor 310 to check each instance of "document.open" in the script. For each match, the parameters and variables of the function "document.open" are retrieved to form the link. The variable rule enables the processor 310 to match segments of the scripts based on variable assignment criteria, i.e., a value assigned to a variable invoked by the segments of the scripts. For instance, a variable rule may cause the processor 310 to monitor a location variable to determine a change in value for the location variable. When a change in the location variable is identified, the value of the location is extracted from the location variable and utilized to generate a link. The dynamic rule enables the processor 310 to match segments of the scripts based on dynamic criteria, i.e., the creation of additional HTML tags that embed content or links. For instance, the dynamic rule causes the processor 310 to check the additional HTML that is created by the script. The additional HTML is checked to extract links associated with anchor tags, image tags, and embed tags for video, images, or any other content. The processor 310 utilizes the base rules 331 to check and evaluate the segments of the scripts that use constants, variables—local, global, and passed-in-function variables—or any combination of variables and constants to generate a link or additional content. Accordingly, when a rule match occurs for a segment of the script, the variables and functions for the segment are identified and utilized to generate a link and obtain metadata for the link. The metadata for the link may include the width and height for a popup window that presents the content associated with the link.

The page globals 332 comprise global variables and constants that are associated with a site or a webpage within the site. The page globals 332 are utilized by the processor 310 to evaluate segments of the scripts that generate links. The page globals 332 include explicit variables, explicit constants, and implicit variables. For instance, the explicit variable may be defined in JavaScript™ by "var var_name=value," where "var" is an operative term for declaring variable, "var_name" is the name of the variable, and "value" is a value assigned to "var_name." The explicit constant may be defined JavaScript™ by "const var_name1=value1," where "const" is an operative term for declaring constants, "var_name1" is the name of the constant, and "value1" is a value assigned to "var_name1." The implicit variables may be defined by "var_name2=value2," where "var_name2" is the name of the variable, and "value2" is a value assigned to "var_name2." The processor 310 monitors the variables and updates the variables when segments of the scripts alter the values assigned to the implicit and explicit variables. For instance, when a segment of script declares a global variable "server" and sets it equal to "www.ut.com," the processor 310 monitors the global variable and checks the scripts for use of the global variable. A "document.open" function that receives the variable "server" concatenated with "/a.mpg" may be evaluated by processor 310 to generate a link "www.ut.com/a.mpg." Thus, the global variables, global constants, and base rules may be utilized concurrently by the processor 310 to evaluate segments of the script that generate links.

The site rules 333 comprise rules that match segments of scripts that are complex. The site rules 333 may be manual rules that are configured to match complex segments of the scripts that generate links or additional content. The site rules 333 may enable the processor 310 to parse additional content formatted as extensible markup language (XML) to locate links associated with the additional content. The additional content formatted in XML may be parsed by the processor 310 to locate specific strings in the additional content that are associated with generating links. In an embodiment, the XML hierarchy, which includes nodes and attribute values, is the basis for identifying and extracting strings from the XML content that are further processed by the processor 310 to discover links. In an alternate embodiment, the XML content is converted to HTML by the processor 310. In some embodiments, the additional content may be in a non-XML format. For instance, when the non-XML format is a text format the processor 310 may utilize stored rules to identify and select string that are associated with generating links.

The auto-discovered page rules 334 comprise new rules that are generated by the processor 310. The new rules include function rules for extended functions that are additional functions related to functions identified in the base rules 331. The processor 310 identifies invocations of additional functions in the scripts. The additional functions may include user-defined functions. When the additional functions encapsulate segments of script that match the base rules 331, new rules are generated for the additional functions. The processor 310 utilizes the base rule 331 to automatically derive new function rules, new variable rules, and new dynamic rules for the additional functions that encapsulate segments of scripts that are associated with functions that match the base rules 331. For instance, an exemplary script may include the following:

```
server = "www.live.com";
function PopupImage(imgName)
{
var ext = ".jpg";
window.open("http://" + server + "/images/" + imgName + ext);
}
```

The exemplary script defines a global variable "server" to be "www.live.com" and defines an additional function—"popupImage (imgName)"—that encapsulates the function "window.open," which is associated with a base rule 331. The processor 310 may parse the exemplary script and generate a new rule for the additional function. The additional function defined by the exemplary script is "popupImage (imgName)," where "popupImage" is the function name and "imgName" is a variable. If "imgName" is initialized as "foo," the processor 310 will generate the link "http://www.live.com/images/foo.jpg." The new rule for the additional function enables the processor 310 to locate subsequent instances of the additional function and to generate appropriate links based on the variables and constants that correspond to the subsequent instances of the additional function in the scripts. In an embodiment, the processor 310 may derive the new rules from base rules 331. The new rules may include link patterns derived from links associated with the base rules 331. Additionally, the new rules may include variables that are derived from the base rules 331. Values for local variables, global variables, and other variables or local constants and global constants are used by the processor 310 to evaluate the additional functions that use the base rules 331. Loops and conditional statements within the additional function are checked by the processor 310 to ensure that the variables have known values. If the processor 310 cannot evaluate the required variables and values, a new rule will not be produced for the additional function. The new rules generated by the processor 310 increase the number of rules for identifying segments of the script that generate links. In an embodiment, additional functions that are defined by an external script and new rules for the additional functions are utilized only when the external script is referenced by the webpage being parsed by the processor 310. If the additional functions are defined by an inline script, the new rules for the additional function are utilized only when inline scripts are parsed by the processor 310 within the context of the webpage. Accordingly, new rules may have a restricted scope.

The content associated with generated links is retrieved and processed to optimize the content for display to the user. The optimized content and links are verified by the processor 310 and stored in an index.

In certain embodiments, the rules engine extracts segments of the scripts that generate links. The rules engine accesses the rules database to match the segments and to evaluate the segments based on the rules stored in rules database. The rules engine verifies the links generated by the segments of the scripts and downloads the content for storage in an index.

Figure 4:
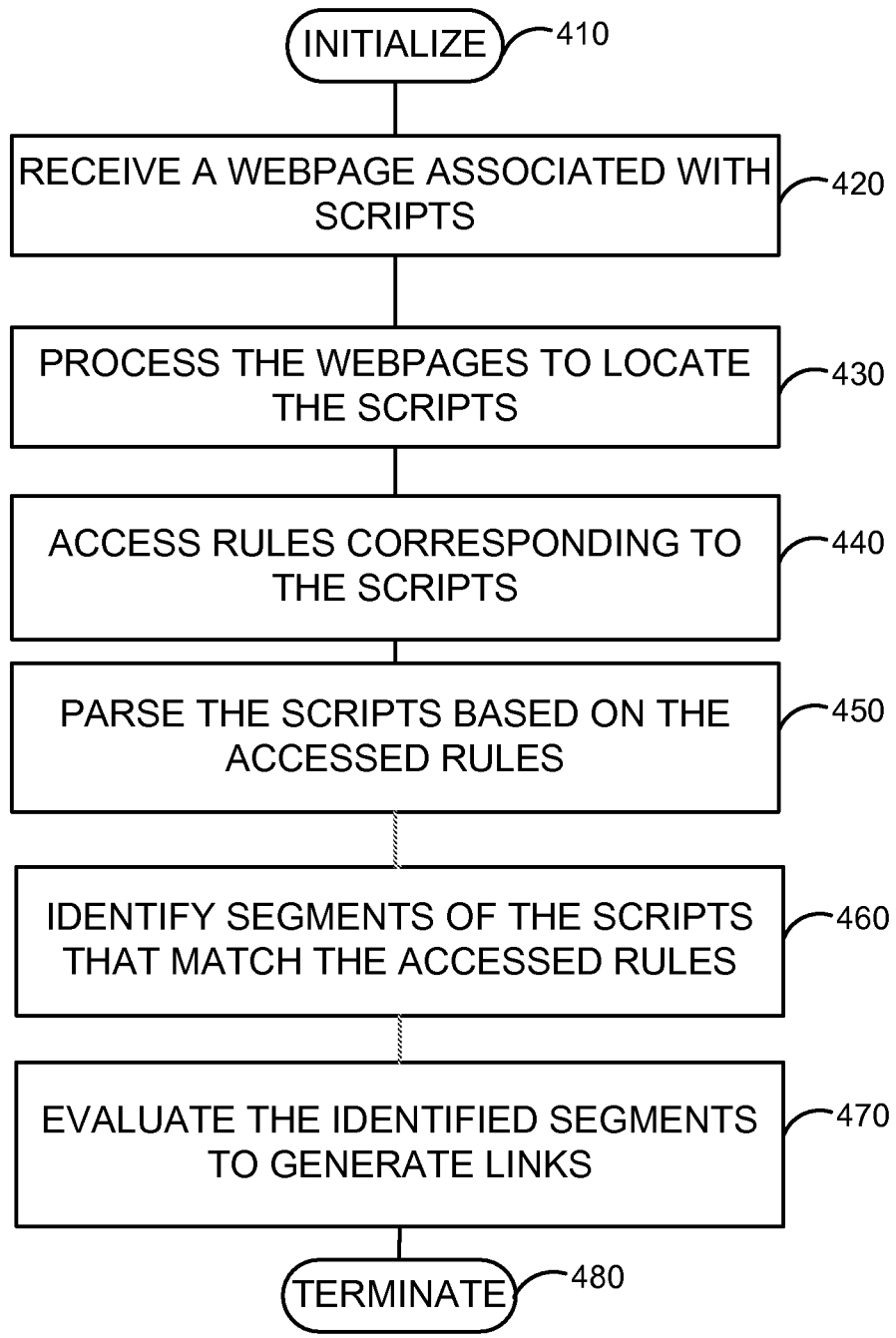
FIG. 4 is a logic diagram that illustrates an exemplary method for discovering links.

FIG. 4 is a logic diagram that illustrates an exemplary method for discovering links. The method initializes in step 410. In step 420, the rules engine receives a webpage associated with the scripts. In step 430, the rules engine processes the webpages to locate the scripts. In step 440, the rules engine accesses rules corresponding to the scripts. In turn, the scripts are parsed by the rules engine based on the accessed rules in step 450. In step 460, the segments of the scripts that match the accessed rules are identified by the rules engine. In step 470, the identified segments are evaluated by the rules engine to generate the links. The method terminates in step 480.

The links generated by segments of the scripts identified by the rules engine are stored in an index. In an embodiment, the links are verified and validated by the rules engine. The index also stores metadata for the links that are generated by the segments of the scripts. The metadata may include data that describes the content associated with the links, and the user interface and player that are utilized to render the content. The metadata may include the position and tag within the segments of the scripts that generate the links.

Figure 5:
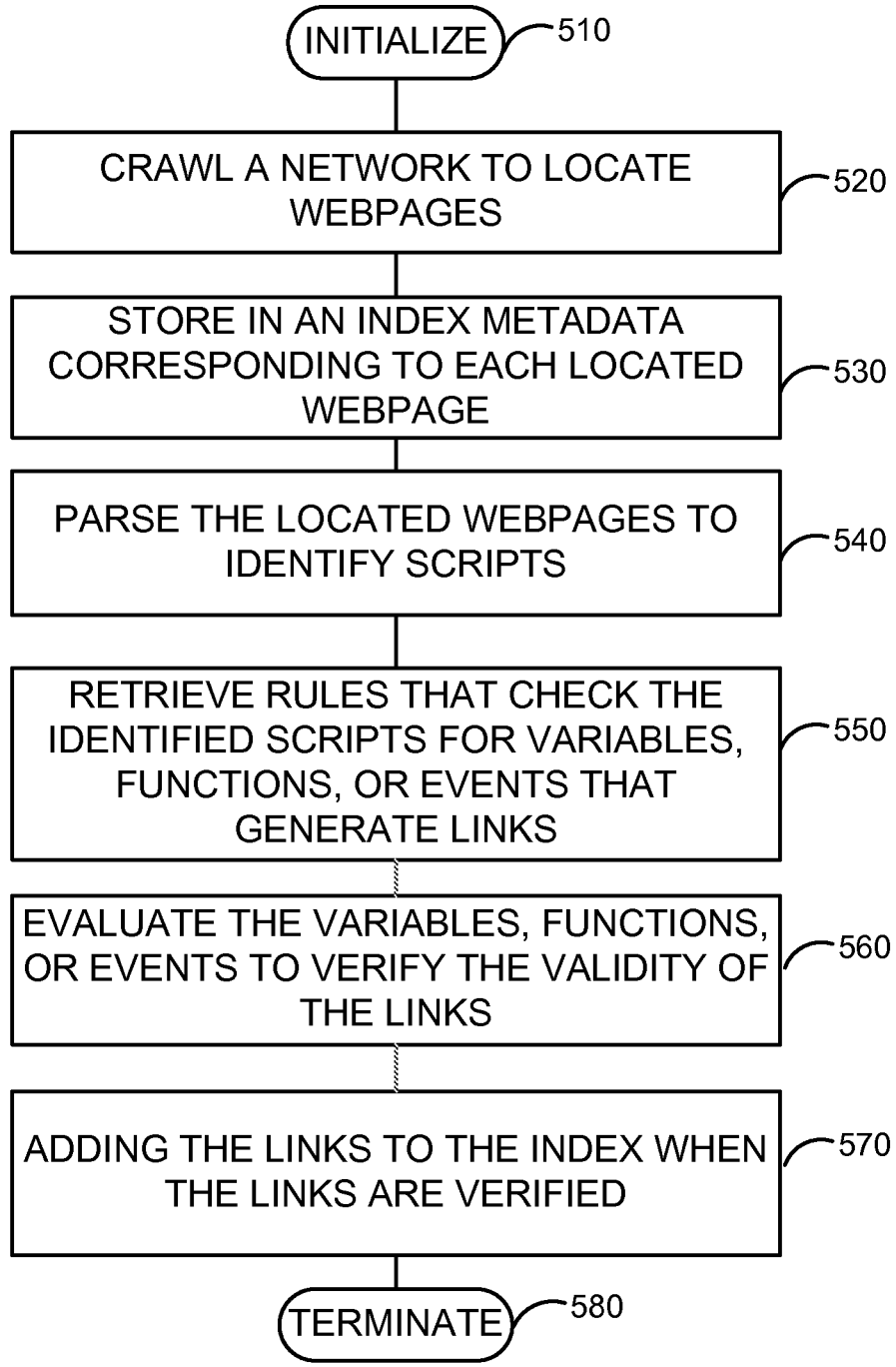
FIG. 5 is a logic diagram that illustrates an exemplary method for generating an index.

FIG. 5 is a logic diagram that illustrates an exemplary method for generating an index. The method initializes in step 510. In step 520, a crawler crawls a network to locate the webpages. In step 530, the crawler communicates with the index engine to store in the index metadata associated with the located webpages. In step 540, the rules engine parses the located webpages to identify scripts. In step 550, the rules engine retrieves rules for the identified scripts. The rules engine checks the identified scripts to locate variables, functions, or events that generate links. In turn, the rules engine evaluates the located variables, functions, or events, to verify and validate the generated links in step 560. In step 570, the verified links are added to the index. The method terminates in step 580.

In summary, direct crawling of webpages and scripts generates an index that includes links and content associated with the webpages and the scripts. The direct crawling includes parsing the script to identify segments that generate links and verifying the generated links. The direct crawling of webpages and scripts enables a processor to index and search for content in the webpages and content associated with links generated by the scripts associated with the webpages.

The foregoing descriptions of the invention are illustrative, and modifications in configuration and implementation will occur to persons skilled in the art. For instance, while the present invention has generally been described with relation to FIGS. 1-5, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

The invention claimed is:

1. A computer-implemented method for discovering links in a script, the method comprising:
receiving webpages associated with one or more scripts, wherein the one or more scripts are Javascripts;

processing the webpages to locate the one or more Javascripts, wherein processing the webpages to locate the Javascripts further comprises:

extracting markup language tags from the webpages to locate function calls, variables, and constants; and identifying script elements and non-script elements based on the markup language tags;

accessing rules corresponding to the one or more Javascripts;

parsing the one or more Javascripts based on the rules corresponding to the one or more Javascripts, wherein the rules include base rules that are applied to all web pages, site rules that are applied to all webpages from a specific site, and auto-discovered rules that are applied to specific webpages;

identifying segments of the one or more Javascripts that satisfy the rules;

evaluating the identified segments of the one or more Javascripts and applying the rules to the extracted function calls, variables, and constants to generate links;

storing the generated links in an index; and retrieving content associated with the generated links;

optimizing the retrieved content; and storing the optimized content and metadata with the generated links, wherein the metadata comprises types of content associated with the generated links, types of files associated with the generated links, dialog attributes associated with the generated links, pop-up attributes associated with the generated links, and display sizes of the content associated with the generated links.

2. The computer-implemented method of claim 1, wherein the links include uniform resource locators that reference webpages, videos, audio, or multimedia content.

3. The computer-implemented method of claim 1, wherein the one or more scripts comprise external scripts that are stored at locations external of the webpages, inline scripts that are contained within the webpages, client-side scripts that are provided by an application executing on a user client device, and event handler scripts that respond to user interaction or web browser events.

4. One or more computer-readable storage devices having computer-executable instructions embodied thereon that perform a method for generating an index that stores links discovered in scripts, the method comprising:

crawling a network to locate webpages;

storing in an index metadata corresponding to each located webpage;

parsing the located webpages to identify scripts associated with the located webpages;

retrieving rules that check the identified scripts for variables, functions, or events, wherein a subset of the variables for the identified scripts are checked to confirm a change of value;

when a change of value for the subset of variables is confirmed, generating links based on the variables, functions, or events;

evaluating the variables, functions, or events to verify the validity of the generated links;

adding the generated links to the index when the generated links are verified;

storing the generated links in the index;

retrieving content associated with the generated links;

optimizing the retrieved content; and storing the metadata with the generated links and the optimized content in the index, wherein the metadata comprises types of content associated with the generated links, types of files associated with the generated links, dialog attributes associated with the generated links, pop-up attributes associated with the generated links, and display sizes of the content associated with the generated links.

5. The computer-readable storage devices of claim 4, wherein the link is a uniform resource locator.

6. The computer-readable storage devices of claim 4, wherein the scripts are generated by external files, inline code, or event handlers.

7. The computer-readable storage devices of claim 4, wherein the links are generated from data received from XML files processed by the identified scripts.

8. The computer-readable storage devices of claim 7, wherein the identified scripts are Javascripts.

9. The computer-readable storage devices of claim 4, wherein additional rules are generated for derived functions, in the identified scripts, that encapsulate a function associated with the retrieved rules.

10. The computer-readable storage device of claim 9, wherein the derived functions generate links.

11. The computer-readable storage devices of claim 9, wherein the additional rules have a scope that is limited to a subset of the located webpages or a segment of the identified scripts in the located webpages on the network.

12. A computing system having processor and hardware memories for discovering links in a script of a webpage, the system comprising:

a crawler accessing web pages to identify scripts associated with the webpages, wherein the webpages are HTML pages;

a rules engine that parses the identified scripts and evaluates portions of the identified scripts based on rules that detect link-generating segments of the identified scripts, wherein the segments of the identified scripts are evaluated based on variables and expressions specified in the identified scripts and matching function patterns located in the segment and the rules to detect links generated by the identified scripts;

an index to store the detected links and metadata for the detected links, wherein the metadata comprises types of content associated with detected links, types of files associated with the detected links, dialog attributes associated with the detected links, pop-up attributes associated with the detected links, and display sizes of the content associated with the detected links; and the processor that retrieves the content associated with the detected links; optimizes the retrieved content; and optimized content in the index with the detected links.

13. The computing system of claim 12, wherein the rules engine verifies the detected links.

14. The computing system of claim 12, wherein the identified scripts correspond to a multimedia player that utilizes client-side scripts associated with XML files, and the rules engine parses the XML files to generate data and performs string transformations on the generated data to extract links from the XML files.

15. The computing system of claim 12, wherein the rules check functions, variables, and event handlers specified in the identified scripts and a subset of the rules are scoped to correspond to a subset of the webpages.

16. The computer-implemented method of claim 1, wherein the base rules further comprise function rules, variable rules, and dynamic rules.

17. The computer-readable storage devices of claim 4, wherein the index stores metadata with each valid generated link, the metadata for each valid link generated includes identifiers for segments of the script associated with the webpage that generated the link and rules that identified the segment of the script.

18. The computer-readable storage devices of claim 4, one or more valid generated links are based on webpage global variables that are defined outside of the scripts.

19. The computer-implemented method of claim 3, wherein the client-side script is associated with media players that play content for a webpage, wherein media files rendered by the media players are accessible based on the link generated by the client-side script.

* * * * *